(12) United States Patent
Yang et al.

(10) Patent No.: US 9,978,482 B2
(45) Date of Patent: May 22, 2018

(54) DIE ASSEMBLY WITH COOLED DIE LAND

(75) Inventors: Yongyong Yang, Shanghai (CN);
Geoffrey D. Brown, Bridgewater, NJ (US); Manish Mundra, Somerset, NJ (US); Bin Li, Shanghai (CN); Journey Lu Zhu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 367 days.

(21) Appl. No.: 13/990,093

(22) PCT Filed: Dec. 30, 2010

(86) PCT No.: PCT/CN2010/080515
§ 371 (c)(1),
(2), (4) Date: May 29, 2013

(87) PCT Pub. No.: WO2012/088692
PCT Pub. Date: Jul. 5, 2012

(65) Prior Publication Data
US 2013/0264092 A1     Oct. 10, 2013

(51) Int. Cl.
*B29C 47/02* (2006.01)
*B29C 47/86* (2006.01)
(Continued)

(52) U.S. Cl.
CPC ......... *H01B 13/14* (2013.01); *B29C 47/0016* (2013.01); *B29C 47/28* (2013.01);
(Continued)

(58) Field of Classification Search
CPC ... H01B 13/14; B29C 47/0014; B29C 47/025; B29C 47/28; B29C 47/862; B29C 47/864
(Continued)

(56) References Cited

U.S. PATENT DOCUMENTS

| 3,073,441 A | * | 1/1963 | Priaroggia et al. | ........... 219/609 |
| 3,574,810 A | | 4/1971 | Tournery et al. | |
| 3,689,610 A | | 9/1972 | Nicholson | |
| 4,348,349 A | | 9/1982 | Kurtz | |
| 4,359,439 A | * | 11/1982 | Fritsch et al. | ................ 264/135 |

(Continued)

FOREIGN PATENT DOCUMENTS

CN        101579915 A     11/2009
DE        19501669 A1      7/1996
(Continued)

OTHER PUBLICATIONS

Machine translation of DE19501669A1.

*Primary Examiner* — Alison L Hindenlang
*Assistant Examiner* — Joseph S Leyson
(74) *Attorney, Agent, or Firm* — Husch Blackwell LLP

(57) ABSTRACT

A die assembly (10) for extruding a polymeric coating onto a wire so as to impart a matte finish to the coating surface is provided. The die assembly (10) comprises: A) a die tip (13) comprising a tubular channel (22) through which a wire can pass, the channel (22) positioned along the central longitudinal axis (26) of the die assembly (10); B) a die body (12) comprising a trunk (15) and a head (16), the head (16) comprising a tubular channel (20), the head tubular channel (20) comprising a die land (21), the trunk (15) positioned about the die tip (13) so as to define an annular space (25) between the exterior surface (23) of the die tip (13) and the interior surface (24) of the trunk (15); C) a die holder (11) positioned about and in contact with the exterior surface (17) of the trunk (15); and D) a radiator (14) positioned about and in contact with the exterior surface (19) of the die land (21) of the die head (16).

5 Claims, 4 Drawing Sheets

(51) Int. Cl.
  *H01B 13/14* (2006.01)
  *B29C 47/28* (2006.01)
  *H01B 7/00* (2006.01)
  *B29C 47/00* (2006.01)
(52) U.S. Cl.
  CPC ............ *B29C 47/864* (2013.01); *H01B 7/00* (2013.01); *B29C 47/0014* (2013.01); *B29C 47/025* (2013.01)
(58) Field of Classification Search
  USPC ...................................... 425/72.1, 113, 378.1
  See application file for complete search history.

(56) References Cited

U.S. PATENT DOCUMENTS

| | | | | |
|---|---|---|---|---|
| 4,505,222 A | * | 3/1985 | Holt et al. ..................... | 118/304 |
| 4,522,776 A | | 6/1985 | Ramamurthy | |
| 4,699,579 A | * | 10/1987 | Bourdon et al. ............. | 425/113 |
| 4,774,906 A | * | 10/1988 | Lu ................................ | 118/404 |
| 4,997,616 A | | 3/1991 | Dehennau et al. | |
| 5,280,137 A | | 1/1994 | Ward | |
| 6,187,422 B1 | | 2/2001 | Murschall et al. | |
| 6,245,271 B1 | | 6/2001 | Jacobs et al. | |

FOREIGN PATENT DOCUMENTS

| | | |
|---|---|---|
| JP | S55-166866 A | 12/1980 |
| JP | 58-007336 | 1/1983 |
| JP | S58-112716 A | 7/1983 |
| JP | 2003015002 A | 1/2003 |
| WO | 2004/076151 A2 | 9/2004 |

\* cited by examiner

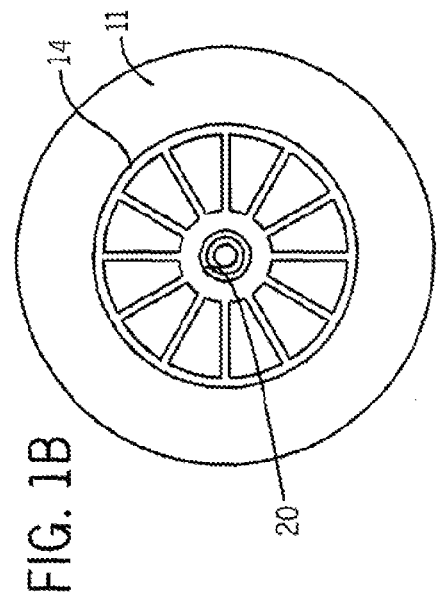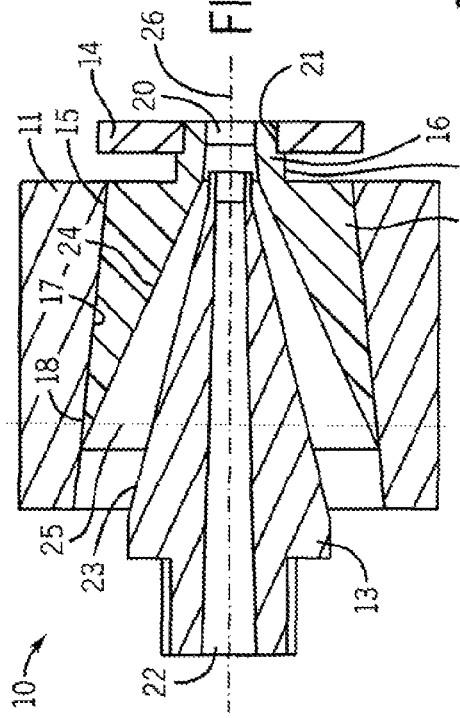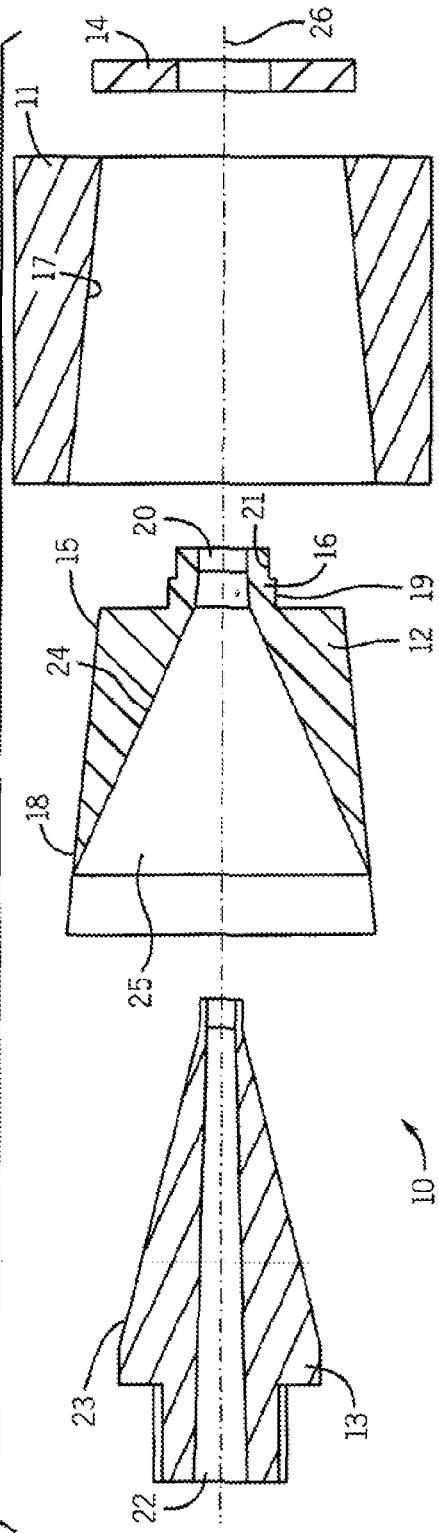

DIE ASSEMBLY WITH COOLED DIE LAND

CROSS REFERENCE TO RELATED APPLICATION

The present application is the national phase of PCT Patent Application No. PCT/CN2010/080515 filed Dec. 30, 2010, the entire content of which is incorporated by reference herein.

BACKGROUND OF THE INVENTION

1. Field of the Invention

This invention relates to wire and cable coatings, particularly protective jackets. In one aspect the invention relates to wire and cable coatings with a matte finish while in another aspect, the invention relates to a die assembly with a cooled die land for imparting a matte finish to a polymeric wire and cable coating. In still another aspect the invention relates to a process of imparting a matte finish to a wire and cable coating without the use of inorganic additives or a change in coating formulation.

2. Description of the Related Art

For some electronic wires, such as power cords, USB cables, HDMI cables, mouse cables and the like, some manufacturers have cosmetic requirements that require these wires and cables to match their electronic products. Some of these manufacturers expect these wires and cables to have a matte surface. Due to the inherent properties of some of the materials used in the manufacture of these coatings, e.g., polyvinylchloride (PVC), thermoplastic polyurethanes (TPU), etc., many of these coatings inherently, without modification of one kind or another, have a glossy surface.

The addition of organic or inorganic additives to the coating formulation, e.g., aluminum trihydrate with a particle size in excess of 5 microns, can reduce the gloss of the wire and cable coating, but this adds expense, time and complexity to the coating manufacturing process. Moreover, the additions of such materials can have an adverse impact on one or more of the other properties of the coating, e.g., flexibility, tensile measures and the like.

SUMMARY OF THE INVENTION

In one embodiment the invention is a die assembly for extruding a polymeric coating onto a wire, the die assembly having a central longitudinal axis and comprising:

A. A die tip comprising an exterior surface and a channel through which a wire can pass, the channel positioned along the central longitudinal axis of the die assembly;

B. A die body comprising a trunk and a head and each of the trunk and head comprising interior and exterior surfaces and the head further comprising a channel, the head channel comprising a die land, the die body trunk positioned about the die tip so as to define an annular space between the exterior surface of the die tip and the interior surface of the die body trunk, the die body head extending beyond the die body trunk and die tip and positioned such that the channel of the die body head is on the central longitudinal axis of the die assembly and in alignment with the channel of the die tip, the interior surfaces of the trunk and head continuous with one another so that molten polymer can move through the annular space and coat onto a wire as the wire passes through the die body head;

C. A die holder comprising an interior surface and positioned about and in contact with the exterior surface of the die body; and D. A radiator positioned about and in contact with the exterior surface of the die land of the die body head.

In one embodiment of the invention, the radiator is of a static design. In one embodiment of the invention, the radiator is of a dynamic design. In one embodiment of the invention, a cooling medium is contacted with the radiator. In one embodiment the cooling medium is compressed air. In one embodiment the cooling medium is circulated through a cooling core within the radiator to reduce the temperature of the surface of the die land.

In one embodiment the invention is a process of using the inventive die assembly to manufacture a coated wire with a matte finish. In one embodiment the invention is a process of making a coated wire with a matte finish, the process comprising the step of extruding a molten polymeric composition having a bulk temperature onto a wire with the proviso that after the molten polymeric composition is applied to the wire and before it exits the die assembly, the molten composition passes over and in contact with a die land that has a temperature below that of the bulk temperature of the composition.

In one embodiment the invention is a coated wire with a matte finish made by a process using the inventive die assembly.

This novel die assembly produces wire and cable coatings with excellent matte surface characteristics without changing the existing coating formulations and without the use of organic or inorganic ingredients to reduce surface gloss. The formulations thus remain the same, and the wait time for the migration of an organic or inorganic additive to the coating surface is avoided. The matte surface can be achieved across a broad range of polymer formulations and extrusion and die and die land temperatures.

BRIEF DESCRIPTION OF THE DRAWINGS

The invention is described generally with reference to the drawings for the purpose of illustrating certain embodiments only, and not for the purpose of limiting the scope of the invention. In the drawings like numerals are used to designate like parts throughout the same.

FIG. 1A is a side view schematic drawing of one embodiment of a die assembly of this invention. The assembly includes a radiator of static design.

FIG. 1B is a front view schematic drawing of the static design radiator of the die assembly of FIG. 1.

FIG. 1C is an exploded, side view schematic drawing of the die assembly of FIG. 1.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

"Composition" and like terms means a mixture or blend of two or more components. "Polymeric composition" and like terms mean a composition in which at least one of the components is a polymer. In the context of a mix or blend of materials from which a cable sheath, e.g., cable jacket, is fabricated, the composition includes all the components of the mix, e.g., polymer, fillers, additives and the like.

"Bulk temperature" and like terms mean the temperature of the molten polymer at the time it is applied to the wire.

"Fluid communication" and like terms mean that a fluid, e.g., a gas, liquid, molten solid, can move from one defined area to another defined area. For example, the annular space and the channel within the die body head are in fluid communication with one another because molten polymer can move from the former to the latter without interruption.

Die Assembly

Figure 3:
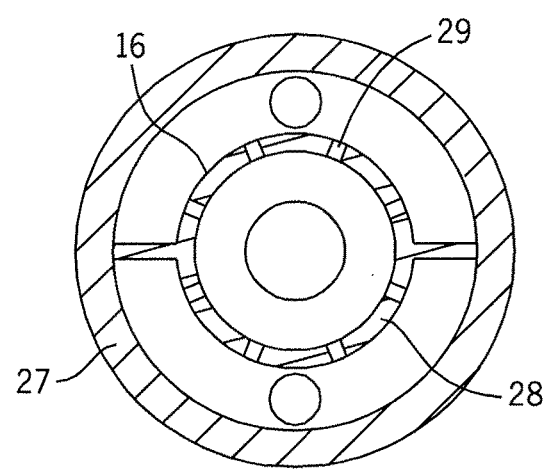
FIG. 3 is a front view schematic drawing of the die assembly of FIG. 2.

Referring to FIGS. 1A-1C, die assembly 10 comprises die holder 11, die body 12, die tip 13 and radiator 14. Die body 12 comprises die body trunk 15 and die body head 16. The cross-sectional shape of die holder 11, die body trunk 15 and die body head 16 is circular as show in FIG. 3. The component parts of the die assembly can be made from any material that is non-reactive under operating conditions with the materials that pass through the parts, and are typically made from stainless steel. The surfaces of the various component parts in contact with molten polymer can be lined or coated or not.

Die body trunk 15 is fitted within die holder 11 such that die body trunk exterior surface 17 is in contact with die holder interior surface 18. Die body head 16 extends out from die body trunk 15 such that die body head exterior surface 19 is not in contact with die holder interior surface 18. Die body head 16 further comprises channel 20 and die body head land (or simply die land) 21. Die land 21 comprises that length of the internal surface of die body head 16 over which, and in contact with, the molten polymeric material must pass to exit the die assembly through die body head channel 20.

Die tip 13 comprises channel 22 and exterior surface 23. Die tip 13 attaches (typically by screw threads not shown) to an extruder or similar device (not shown), and die body 12 is fitted about die tip 13 such that die tip exterior surface 23 and die body trunk interior surface 24 form annular space 25 which is in fluid communication with channel 20. The configuration and volume of annular space 25 can vary but typically the configuration tapers as the space approaches channel 20. Channels 20 and 22 are in fluid communication, are typically tubular in configuration, and lie on central longitudinal axis 26 of die assembly 10 and in alignment with each other.

Radiator 14 can be either of a circulation or non-circulation design. Radiator 14 of FIG. 1 is of a non-circulation design, i.e., it does not comprise passageways, channels or like structures through which a cooling medium can circulate. It is typically a structure of metal, e.g., copper, aluminum, an alloy of one or both, and equipped with fins or like structures to provide ample surface area over which heat can be dissipated into the surrounding environment. Radiator 14 is positioned about and in contact with die body head exterior surface 19 over die land 21. The dissipation of heat from radiator 14 of FIG. 1 can be augmented by contacting the radiator with a cooling medium, e.g., compressed air (the source of which is not shown). In this embodiment, compressed air is simply blown onto the surface of radiator 14.

Figure 2:
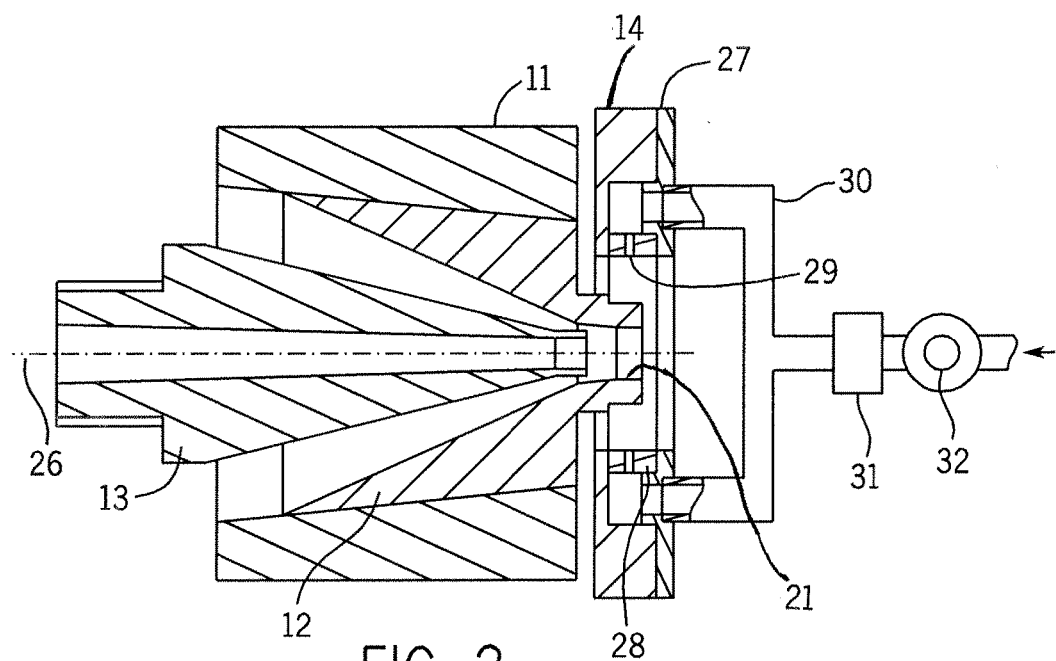
FIG. 2 is a side view schematic drawing of one embodiment of a die assembly of this invention. The assembly includes a radiator of dynamic design.

In FIG. 2 radiator 14 is of a circulatory design. In this design the radiator comprises internal cooling ring 27 which is equipped with air distributor 28 and blow pistol 29, and is in fluid communication with a source of a cooling medium, e.g., compressed air, (the source of the cooling medium is not shown). As in FIG. 1A, radiator 14 is positioned about and in contact with die body head exterior surface 19 over die land 21. Radiator 14 is connected by line 30 to the compressed air source, and line 30, e.g., a hose or pipe, can be equipped with flux meter 31 and flux controller 32.

Operation of the Die Assembly

The operation of the die assembly is described in the context of applying a coating to a wire with the understanding that the wire can be replaced with any similar long, thin, continuous object, e.g., cable, fiber optic filament or bundle, fiber strand or bundle, etc., and such objects can be uncoated or already carrying a coating of one kind or another. The die assembly is operated at temperatures and pressures necessary to maintain the coating polymer is a sufficiently molten and fluid state such that it can pass smoothly and consistently through channels 22 and 20 yet adhere to the wire as it is applied. Typically these conditions include a positive pressure, i.e., in excess of atmospheric pressure, and an elevated temperature, e.g., 165° C. or above.

The wire (not shown) enters die tip 13 in such a manner and in such a location so that it is pulled or drawn smoothly and continuously along central longitudinal axis 26 through channel 22. The means for pulling or drawing the wire through the die assembly can vary to convenience, but typically include a pair of pinch rollers and/or a windup drum (not shown). Molten polymeric composition (not shown) comprising one or more polymers of any suitable kind, e.g., thermoplastic polyurethane (TPU), polyolefin, polyvinyl chloride, etc., passing from an extruder or other coating device (not shown) enters annular space 25 and is applied to the wire in die body head channel 20. The polymer-coated wire passes over die head land 21 before exiting die body head 16. Heat is transferred to the polymeric composition by heating elements with which the extruder is equipped and through the shear action to which the polymeric composition is subjected while in the extruder and die assembly.

Die holder 11 may also be equipped with one or more heating elements (not shown) to assist in keeping the polymeric composition molten and fluid while it is within annular space 25. If employed, then the heat imparted to die holder 11 from the heating elements is transferred by convection to die holder trunk 15 and the polymeric composition within annular space 25. Such heating elements are optional, however, since the heat generated by the shear forces to which the polymeric composition is subjected while passing through annular space 25 and channel 20 are such that extraneous heating is not required to maintain its fluidity within these spaces.

As molten polymer moves from annular space 25 into channel 20 and onto the wire, it begins to congeal and/or cure on the wire. The finish of the surface of the coated wire is a function of several factors two of which are the speed of the coated wire over the die land and the temperature of the die land. Typically, the faster the coated wire moves over the die land and the closer the temperature of the die land is to that of the molten polymeric composition, the glossier the finish. Conversely, the slower the coated wire moves over the die land and the more the temperature of the die land is below that of the bulk temperature of the polymeric composition, the less glossy (or the more matte) the finish. A matte finish is a function of the surface roughness of the coating and, at a micro-level, a cold (relative to the temperature of the polymeric composition) surface promotes faster solidification of the molten polymer and a faster solidification usually results in a rough surface (at least at the micro-level). To this end, die body head 16 is equipped with radiator 14 such that the cooling effect of radiator 14 is imparted to die body head land 21 over which the coated wire must pass just prior to exiting die assembly 10.

The operation of radiator 14 can vary widely. In one embodiment the radiator is of a non-circulation design, and heat is transferred by convection from the polymeric composition to die head 16 to radiator 14 and ultimately, to the surrounding environment. The rate of heat transfer is a function of a number of different variables, e.g., size of the die head, surface area of the radiator, temperature of the surrounding environment, etc. The rate of heat transfer can be enhanced by contacting the radiator with a cooling medium such as compressed air.

In one embodiment the radiator is of a circulation design, i.e., it is designed for the passage of a cooling medium through its interior to enhance its ability to transfer heat away from the die body head and polymeric composition. Variables that influence the performance of a circulation radiator, in addition to those factors that influence the performance of a non-circulation radiator, include the type and amount of cooling medium circulated through the radiator, the rate at which the cooling medium is circulated through the radiator, and the size of the radiator cooling ring or loop.

In one embodiment compressed air from a source not shown is metered through flux controller 32 and flux meter 31 into line 30 and cooling ring 27. Within cooling ring 27 the compressed air moves through air distributor 28 and impinges upon die body head land 21 through the action of blow pistol 29. The impingement of compressed air upon the land typically lowers the temperature of the land. The degree by which the temperature of the land is lowered relative to the bulk temperature of the polymeric material within channel 20 is a function of a number of variables including the number and placement of the air distributors and blow pistols, the size of the radiator and its cooling ring, etc. Another factor influencing the ultimate temperature of the die land is the outer diameter of the die body head relative to the inner diameter of the die body head (i.e., the wall thickness of the die body head), with the smaller the OD (or the thinner the wall), the more cooling effect from a radiator of any given size. In one embodiment the temperature of the polymer on the wire is reduced to less than 165° C.

Specific Embodiments

One cable formulation was prepared using TPU resin with flame retardant (aluminum trihydrate (ATH, 40-50%) and an antioxidant. The formulation is reported in Table 1.

TABLE 1

Cable Coating Formulation

| Component | Supplier | A 1687 GY EXP1 |
|---|---|---|
| TPU (Estane 58219) | Lubrizol | 32.64 |
| MG1 MB (K7JK9) | NHH | 2.00 |
| BDP (FP600) | CCP | 13.51 |
| Novolac (DEN431) | Dow | 1.69 |
| ATH (H-42M) | Showa | 39.33 |
| TiO2 (R103) | DuPont | 9.22 |
| 168 | BASF | 0.09 |
| 1010 | BASF | 0.52 |
| 866 | BASF | 1.00 |
| Sum | | 100.00 |

The inventive composition was processed along with a commercially available product as a comparative example. The processing conditions are reported in Table 2:

TABLE 2

Cable Coating Conditions

| | Line Speed | Die Cooling | Appearance of Coating |
|---|---|---|---|
| Sample 1 | 30 m/min | No air cooling | Very glossy |
| Sample 2 | 72 m/min | Air cooling; ~200 l/h, 2 bar | A little glossy |
| Sample 3 | 43 m/min | Air cooling: ~200 l/h, 2 bar | Matte |

Figure 6:
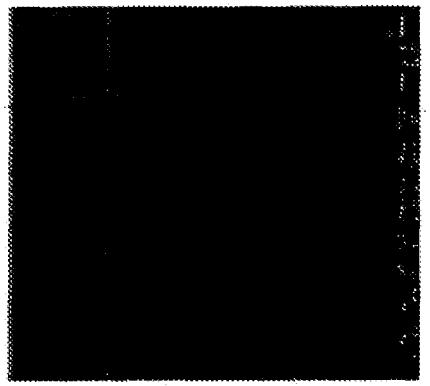
FIGS. 4-6 are scanning electron microscopy (SEM) micrographs showing the surface morphology of three exemplary sample wire coatings comprising the same coating formulation but each made at a different line speed and two made with air cooling and one without air cooling.
Figure 5:
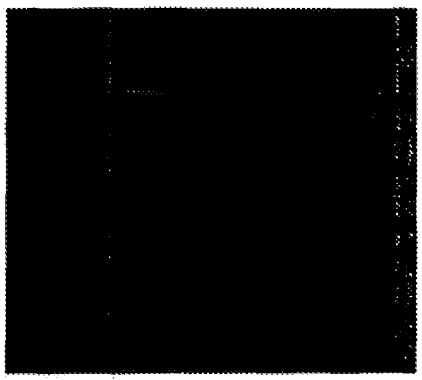
Figure 4:
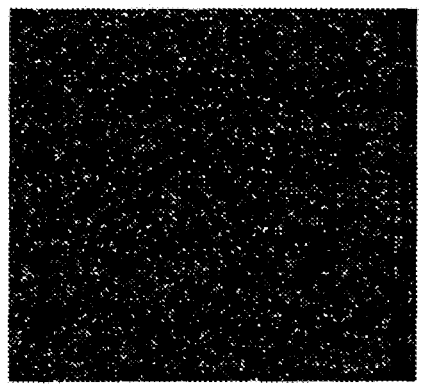

Scanning Electron Micrograph (SEM) micrographs of the sample surfaces are shown in FIGS. 4-6. The SEM images demonstrate the improved surface roughness of Sample 3 relative to the same polymer composition processed under non-ideal conditions (Samples 1 and 2).

Figure 7:
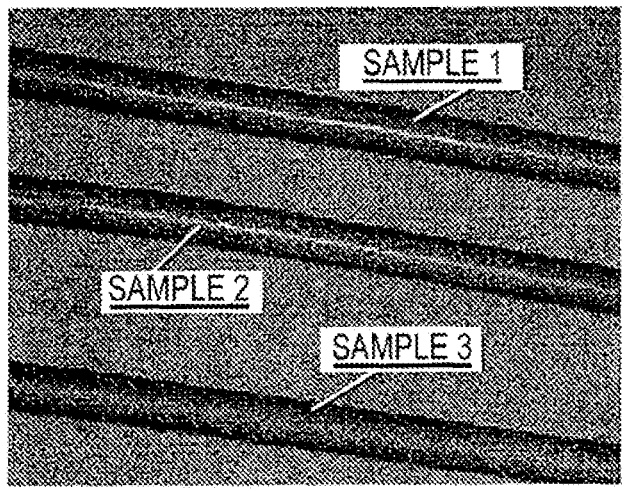
FIG. 7 is a photograph showing the difference in surface finish of three sample wire coatings shown in FIGS. 4-6.
Figure 8:
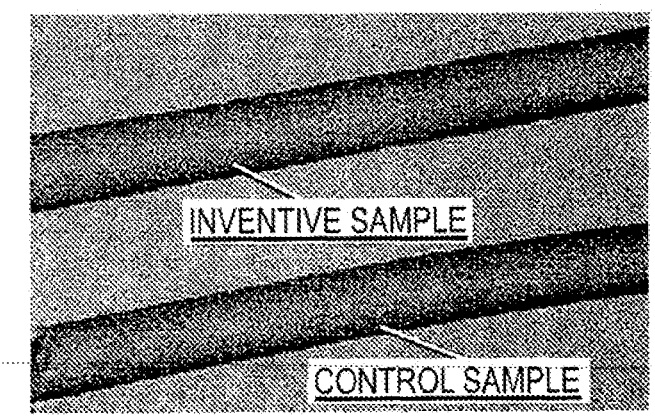
FIG. 8 is a photograph showing the difference in surface finish of one wire coating made with air cooling, and one commercially coated wire made without air cooling.

The three inventive examples (FIG. 7) were compared and sample 3 was found to have the aesthetics and matte surface required of the application. FIG. 8 compares the inventive example 3 against a cable produced using a commercially available resin. FIG. 8 shows that both the inventive example and the benchmark commercially available resin afford similar surface gloss. The inventive example 3 also affords improved regularity of the surface, while the commercially available product has issues in terms of roughness.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

The invention claimed is:

1. A die assembly for extruding a polymeric coating having a matte surface onto a wire, the die assembly having a central longitudinal axis and comprising:
   A. a die tip comprising an exterior surface and a channel through which a wire can pass, the channel positioned along the central longitudinal axis of the die assembly;
   B. a die body comprising a trunk and a head and each of the trunk and head comprising interior and exterior surfaces and the head further comprising a channel and a tapered die land, the tapered die land located exclusively within the die body head and not extending into the die body trunk, the die body trunk positioned about the die tip so as to define an annular space between the exterior surface of the die tip and the interior surface of the die body trunk, the die tip located within the die body trunk and extending into the die body head, the die body head extending beyond the die body trunk and die tip and positioned such that the channel of the die body head is on the central longitudinal axis of the die assembly and in alignment with the channel of the die tip, the interior surfaces of the trunk and head continuous with one another so that molten polymer can move through the annular space and coat onto a wire as the wire passes through the die body head;
   C. a die holder comprising an interior surface and positioned about and in contact with the exterior surface of the die body trunk but not in contact with the die body head; and
   D. a cooling radiator of a circulation design positioned (i) about and in contact with the exterior surface of the die body head, and (ii) spaced apart from the die body holder and the die body trunk.

2. The die assembly of claim 1 in which the radiator comprises a cooling ring equipped with an air distributor and blow pistol, and is in fluid communication with a source of cooling medium.

3. The die assembly of claim 2 in which the cooling medium is compressed air.

4. The die assembly of claim 1 in which the die tip channel and the head channel are tubular.

5. The die assembly of claim 1 in which the die holder is equipped with one or more heating elements.

* * * * *